United States Patent
Persson et al.

(10) Patent No.: US 11,021,276 B2
(45) Date of Patent: Jun. 1, 2021

(54) METHOD FOR PRODUCING A PACKAGING MATERIAL, AND A METHOD FOR PRODUCING A PACKAGE

(71) Applicant: Tetra Laval Holdings & Finance S.A., Pully (CH)

(72) Inventors: Ola Persson, Löddeköpinge (SE); Karin Olsson, Lund (SE); Pär Rydberg, Genarp (SE); Peter Williamsson, Landskrona (SE); Mugeni Nuamu, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 162 days.

(21) Appl. No.: 16/319,970

(22) PCT Filed: Jul. 20, 2017

(86) PCT No.: PCT/EP2017/068336
§ 371 (c)(1),
(2) Date: Jan. 23, 2019

(87) PCT Pub. No.: WO2018/019695
PCT Pub. Date: Feb. 1, 2018

(65) Prior Publication Data
US 2019/0225356 A1    Jul. 25, 2019

(30) Foreign Application Priority Data

Jul. 25, 2016   (EP) ..................................... 16180987

(51) Int. Cl.
*B65B 3/02* (2006.01)
*B32B 15/08* (2006.01)
(Continued)

(52) U.S. Cl.
CPC ................ *B65B 3/025* (2013.01); *B31F 1/07* (2013.01); *B32B 3/263* (2013.01); *B32B 5/02* (2013.01);
(Continued)

(58) Field of Classification Search
CPC ...... B65D 5/746; B65D 5/067; B65D 5/4212; B65D 85/72; B65D 65/403; B31F 1/07;
(Continued)

(56) References Cited

U.S. PATENT DOCUMENTS 1,128,759 A * 2/1915 Clarke ................. B29C 55/023
                                                  428/179
2,916,080 A * 12/1959 Villoresi .................. B31F 1/07
                                                  156/206
(Continued)

FOREIGN PATENT DOCUMENTS

| RU | 2 426 649 C1 | 8/2011 |
| RU | 2 448 836 C2 | 4/2012 |
| WO | 2012/105891 A1 | 8/2012 |

OTHER PUBLICATIONS

Extended European Search Report dated Mar. 20, 2017, issued by the European Patent Office in the corresponding European Patent Application No. 16180987.6-1708. (8 pages).
(Continued)

*Primary Examiner* — Thomas M Wittenschlaeger
(74) *Attorney, Agent, or Firm* — Buchanan Ingersoll & Rooney PC

(57) ABSTRACT

A method for producing a packaging material comprises providing a core material layer of fibre-based material having an inner side and an outer side, embossing the core material layer for forming embossed features having an initial height, the embossed features protruding from the outer side of the core material layer to later form a tactile
(Continued)

pattern on a side of the package to be formed by the packaging material, and laminating at least one layer to the inner side of the embossed core material layer such that the height of the embossed features is temporarily reduced to a minimum height.

19 Claims, 4 Drawing Sheets

(51) Int. Cl.

| | |
|---|---|
| *B32B 15/20* | (2006.01) |
| *B32B 3/26* | (2006.01) |
| *B32B 5/02* | (2006.01) |
| *B65B 3/04* | (2006.01) |
| *B65B 7/16* | (2006.01) |
| *B65D 5/06* | (2006.01) |
| *B65D 5/42* | (2006.01) |
| *B65D 5/74* | (2006.01) |
| *B65D 65/40* | (2006.01) |
| *B65D 85/72* | (2006.01) |
| *B32B 38/06* | (2006.01) |
| *B31F 1/07* | (2006.01) |
| *B31B 50/88* | (2017.01) |
| *B31B 100/00* | (2017.01) |
| *B31B 110/30* | (2017.01) |
| *B31B 120/40* | (2017.01) |

(52) U.S. Cl.
CPC ............ *B32B 15/08* (2013.01); *B32B 15/20* (2013.01); *B32B 38/06* (2013.01); *B65B 3/04* (2013.01); *B65B 7/16* (2013.01); *B65D 5/067* (2013.01); *B65D 5/4212* (2013.01); *B65D 5/746* (2013.01); *B65D 65/403* (2013.01); *B65D 85/72* (2013.01); *B31B 50/88* (2017.08); *B31B 2100/0022* (2017.08); *B31B 2110/30* (2017.08); *B31B 2120/40* (2017.08); *B31F 2201/0715* (2013.01); *B31F 2201/0761* (2013.01); *B32B 2307/7244* (2013.01); *B32B 2309/04* (2013.01); *B32B 2309/10* (2013.01); *B32B 2309/12* (2013.01); *B32B 2439/62* (2013.01)

(58) Field of Classification Search
CPC ..... B31F 2201/0761; B31F 2201/0715; B32B 5/02; B32B 38/06; B32B 15/08; B32B 15/20; B32B 2439/62; B32B 2307/7244; B32B 2309/10; B32B 2309/12; B32B 2309/04; B65B 7/16; B65B 3/025; B65B 3/263; B65B 3/04; B31B 2100/0022; B31B 2100/30; B31B 2120/40; B31B 50/88
USPC .......... 156/209, 219, 83, 277; 162/109, 116, 162/117

See application file for complete search history.

(56) References Cited

U.S. PATENT DOCUMENTS

| | | | | |
|---|---|---|---|---|
| 2,974,716 | A * | 3/1961 | Fourness | B65D 65/403 428/180 |
| 3,481,818 | A * | 12/1969 | Wellen | B32B 27/00 428/161 |
| 5,910,226 | A * | 6/1999 | Moeder | B29C 51/02 156/304.5 |
| 6,533,884 | B1 * | 3/2003 | Mallik | B29C 59/046 156/209 |
| 7,132,151 | B2 * | 11/2006 | Rasmussen | B32B 3/28 428/182 |
| 7,815,764 | B2 * | 10/2010 | Perini | B31F 1/07 156/209 |
| 8,012,311 | B2 * | 9/2011 | Jeannot | B31F 1/07 162/205 |
| 8,158,047 | B2 * | 4/2012 | Schulz | B32B 23/10 264/280 |
| 8,853,328 | B2 * | 10/2014 | Choi | B29C 71/04 525/222 |
| 9,452,089 | B2 * | 9/2016 | Marinelli | A61F 13/15731 |
| 9,567,129 | B2 * | 2/2017 | Wong | B65D 5/46072 |
| 9,637,862 | B2 * | 5/2017 | Saas | B31F 1/07 |
| 2004/0076798 | A1 * | 4/2004 | Larsson | B31F 1/07 428/153 |
| 2009/0255640 | A1 | 10/2009 | Morin et al. | |
| 2011/0123773 | A1 * | 5/2011 | Lofink | B31F 1/07 428/166 |
| 2012/0103856 | A1 * | 5/2012 | Toft | B32B 15/08 206/524.2 |
| 2014/0001248 | A1 * | 1/2014 | Wong | B65D 5/46072 229/116.1 |
| 2017/0151765 | A1 * | 6/2017 | Ohman | B32B 3/26 |

OTHER PUBLICATIONS

International Search Report (PCT/ISA/210) dated Sep. 25, 2017, by the European Patent Office as the International Searching Authority for International Application No. PCT/EP2017/068336.
Written Opinion (PCT/ISA/237) dated Sep. 25, 2017, by the European Patent Office as the International Searching Authority for International Application No. PCT/EP2017/068336.

* cited by examiner

METHOD FOR PRODUCING A PACKAGING MATERIAL, AND A METHOD FOR PRODUCING A PACKAGE

TECHNICAL FIELD

The present invention relates to a method for producing a packaging material, and in particular to a method for providing the packaging material with an embossed pattern, as well as a package formed by such packaging material. The present invention also relates to a method for producing a package, and a package produced by such method.

BACKGROUND

Some existing carton-based packages for liquid foods comprise a tubular body extending between a closed bottom and a top. The bottom is typically planar such that the package can rest on a table, and the top typically comprises an opening arrangement.

Such disposable packages, particularly those for storing liquid foods, are frequently produced from a packaging laminate which consists of a core layer of paper, which layer is covered with a polymeric decor layer on a first, or outer, side. On the other side (i.e. the inner side facing the product to be enclosed) a multi-layer sheet is provided. The inner multi-layer typically comprises a first layer of polymeric material, a barrier film, and a second additional layer of polymeric material. The laminated packaging material is frequently supplied in the form of a continuous web being reeled on a storage reel and which, after having been unrolled from its storage reel converted, by means of folding, sealing, filling and final folding into filled packaging containers in automatic filling machines.

Liquid food packages are provided in a number of different dimensions for enclosing liquid food, such as milk, juice, etc, of different volumes. For example, a juice package of the described disposable carton-based type may enclose a volume between 0.1 and 2 litres, such as between 0.25 and 2 litres. Since the size of the package may vary widely, it may not be immediately clear for a user of the package how to grip the package in an optimum way for facilitating handling and pouring.

In WO2012/105891 by the same applicant it has been suggested to provide a tactile pattern on the packaging material. The tactile pattern, being provided as depressions at the outer side of the packaging material, is positioned so that intended gripping areas are pronounced at the final package. The tactile pattern serves mainly two purposes; to indicate where to grab the package, and to improve the ability to grip the package. Although proven to provide very satisfactory results the solution presented in the above-mentioned document is limited to depressions. For situations where the tactile pattern is expected to protrude out from the outer side of the packaging material the solution presented above may no longer be used.

In view of this there is a need for an improved method allowing protruding tactile patterns to be present at the outer side of the packaging material, i.e. the side which is intended to face the surroundings outside the final package.

SUMMARY

Accordingly, the present invention preferably seeks to mitigate, alleviate or eliminate one or more of the above-identified deficiencies in the art and disadvantages singly or in any combination and solves at least the above mentioned problems.

An object of the present invention is to provide a packaging material having protruding features on the side being intended to form the outer, or exterior, side of the final package.

A further object of the present invention is to provide a method for producing a packaging material which ensures the integrity of the inner laminate layers, i.e. the inner side of the packaging material being intended to form the inner, or interior, side of the final package.

An idea of the present invention is to perform embossing of the tactile pattern prior to lamination. The inventors have discovered that if embossing is performed after lamination there is a risk that at least some of the layers of the laminated packaging material will be damaged during the embossing. This is especially the case when the packaging material is provided with a barrier, such as aluminium foil. During embossing, which requires comparatively large pressure, the dies may damage the aluminium foil such that the integrity of the entire package is reduced significantly.

According to a first aspect, a method for producing a packaging material is provided. The method comprises providing a core material layer of fibre-based material having an inner side and an outer side, embossing said core material layer for forming embossed features having an initial height, said embossed features protruding from the outer side of said core material layer to later form a tactile pattern on a side of the package to be formed by said packaging material, and laminating at least one layer to the inner side of said embossed core material layer such that the height of the embossed features is temporarily reduced to a minimum height.

The initial height of the embossed features immediately after embossing may be in the range of 20-200 μm, such as 50-200 μm.

The minimum height of the embossed features immediately after lamination may be in the range of 20-80% of the height prior to lamination, preferably in the range of 30-60%, and even more preferably in the range of 35-45%.

In an embodiment, embossing is performed by arranging the core material layer between a male die and a female die.

The male die may be provided as a male die roller, the female die may be provided as a female die roller, and the core material layer may be fed through a nip between said rollers.

The method may further comprise printing a decor layer on the outer side of said core material layer prior to embossing.

The method may further comprise laminating at least one layer to the outer side of said core material layer prior to embossing. Optionally, the method further comprises laminating at least one layer to the outer side of said core material layer after embossing.

According to a second aspect, a packaging material is provided being produced by the method according to the first aspect.

The laminated packaging material comprises a core material layer of fibre-based material having an inner side and an outer side, the core material layer having embossed features protruding from the outer side of the core material layer to later form a tactile pattern on a side of a package to be formed by the laminated packaging material, the inner side of the core material layer having only indentations and no protrusions, at least one outer layer of polymer, laminated to the outer side of the core material layer, and a multi-layer structure layer, comprising at least one layer of polymer material to be in contact with the liquid food product intended to be contained in the package, a protective layer to protect against oxygen transmission, and a lamination layer of polymer material, laminated to the inner side of the core material layer, the lamination layer thus being laminated between the protective layer and the core material layer, wherein the embossed features, appearing on the laminated packaging material, are flattened to have a temporarily reduced minimum height, and are able to regain height by one or more steps of action during at least 0.1 s, selected from increasing the temperature in the packaging material to from 30 to 90° C., and increasing the pressure acting on the inner side of the packaging material to from 0.5 to 1.2 Bar over-pressure, such that the height of the embossed features is increased relative its minimum height and thereby provides the intended tactile effect.

The fibre-based material may be a paperboard or carton of the type suitable for liquid carton packaging.

The protective layer, to protect against oxygen gas transmission from the outside of the package to the interior and the packaged food product, may be a metal foil, such as an aluminium foil.

On the outer and inner sides of the core layer, as outermost layers, liquid-tight and heat-sealable layers of thermoplastic polymer are applied. The thermoplastic polymer may be a polyolefin, such as polyethylene or polypropylene or polymer blends or copolymers made of olefin monomers.

The laminated packaging material may further comprise a printed decor layer on the outer side of the core material layer, wherein the embossed features are aligned with the printed decor such that the embossed features also provide visual effects to the decor.

According to a third aspect a method for producing a package from a packaging material having embossed features to later form a tactile pattern on a side of the package to be formed by said packaging material is provided. The height of said embossed features is temporarily reduced to a minimum height, and the method comprises feeding the packaging material through a filling machine, and forming, filling, and sealing a package from at least a part of said packaging material. The method further comprises increasing the temperature of the packaging material, the humidity of the packaging material, and/or the pressure acting on the packaging material such that the height of the embossed features is increased relative its minimum height.

Increasing the temperature of the packaging material may be performed such that the temperature reaches 30-90° C., such as 60-90° C.

Increasing the humidity of the packaging material may be performed such that the humidity reaches 50-100%.

Increasing the humidity of the packaging material may be performed by transporting the packaging material through liquid hydrogen peroxide.

Increasing the pressure acting on the packaging material may be performed by filling the package with a liquid content such that the liquid content applies a pressure on the inner side of said package.

The height of the embossed features of the final package may be in the range of 20-200% of the minimum height, preferably in the range of 50-150%, and even more preferably in the range of 80-120%.

In an embodiment, the packaging material is manufactured according to the first aspect.

The height of the embossed features of the final package is in the range of 50-90% of the initial height, preferably in the range of 60-90%, and even more preferably in the range of 70-90%.

According to a fourth aspect, a package is provided. The package is produced by the method according to any one of the first aspect.

BRIEF DESCRIPTION OF DRAWINGS

These and other aspects, features and advantages of which the invention is capable of will be apparent and elucidated from the following description of embodiments of the present invention, reference being made to the accompanying drawings, in which.

DETAILED DESCRIPTION

Embodiments of the present invention will be described in more detail below with reference to the accompanying drawings in order for those skilled in the art to be able to carry out the invention. The invention may, however, be embodied in many different forms and should not be construed as limited to the embodiments set forth herein. The embodiments do not limit the invention, but the invention is only limited by the appended patent claims. Furthermore, the terminology used in the detailed description of the particular embodiments illustrated in the accompanying drawings is not intended to be limiting of the invention.

Figure 1:
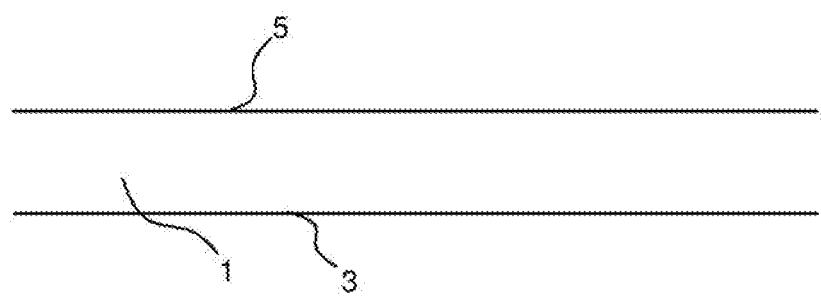
FIG. 1 is a cross sectional view of a core material layer later forming part of a packaging material according to an embodiment.

With reference to FIG. 1 a core material layer 1 for later forming part of a packaging material is shown. The core layer 1 has an inner side 3, which is intended to face the interior of the final package, and an outer side 5 which consequently is intended to face the outer environment of the final package. As can be seen in FIG. 1 the core material layer 1 is substantially planar. The core material layer 1 is preferably provided as a fibre-based material, such as e.g. board, paper, paperboard, cardboard, etc. The purpose of the core material layer 1 is to provide robustness and stability to the packaging material to be formed, as is well known in the art. The core material layer 1 is optionally provided with decor, i.e. a printed pattern, on its outer side 5.

Before lamination, i.e. the process of providing the inner and outer side 3, 5 of the core material layer 1 with protective polymeric layers, the core material layer 1 is subjected to embossing. Embossing should within this context be interpreted as any process in which the surface of the core material layer 1 is altered by providing raised features at selected areas. However, in some embodiments a protective layer is provided on the outer side 5 of the core material layer 1 prior to embossing as will be further explained below.

Figure 2A:
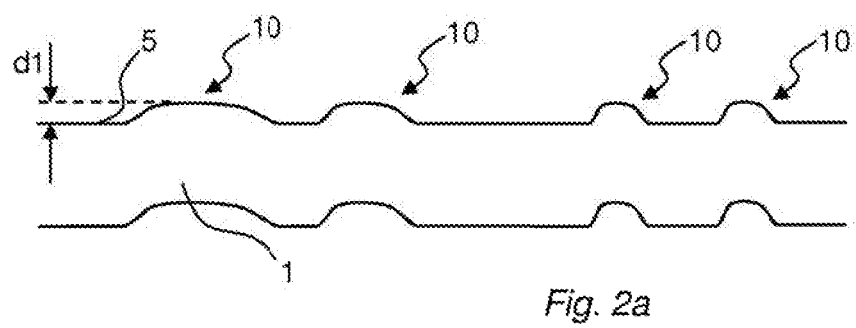
FIG. 2a is a cross sectional view of the core material layer shown in FIG. 1, after embossing.
Figure 2B:
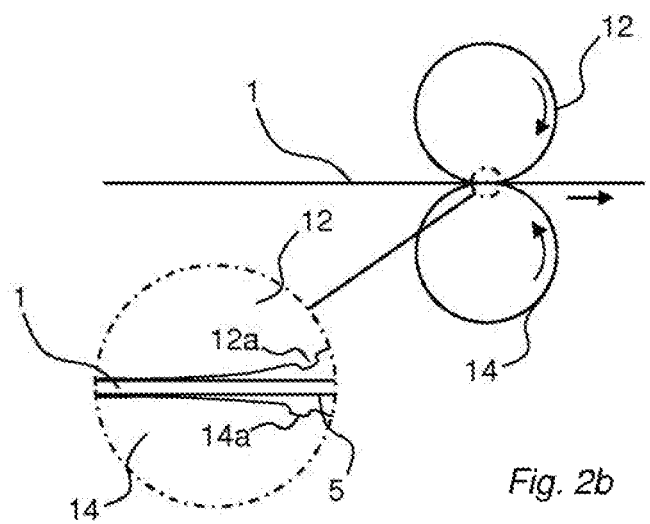
FIG. 2b is a side view of an embossing station.

Now turning to FIG. 2 the core material layer 1 is shown after embossing. The embossing is preferably performed using an embossing station, e.g. in accordance with what is shown in FIG. 2b. During the embossing step the core material layer 1 is arranged between a male die 12, having protrusions 12a corresponding to the desired embossing pattern, and a female die 14 having recesses 14a matching with the protrusions 12a of the male die 12. By applying a specific pressure to the dies 12, 14 the fibres of the core material layer 1 will be pressed, or squeezed towards each other thus resulting in a patterned area of raised features. This is shown in FIG. 2a, where embossing of the core material layer 1 has provided a pattern of raised areas, i.e. embossed features 10. The exact configuration of the pattern may be selected depending on various parameters such as position, height, width/depth, etc.

As can be seen in FIG. 2a the embossed pattern is protruding outwards at the outer side 5 of the core material layer 1. This means that during embossing the outer side 5 is arranged in contact with the female die 14, while the male die 12 engages with the inner side 3 of the core material layer 1.

The dies 14, 12 may preferably be provided as rollers, wherein the male die roller 12 is equipped with protrusions 12a extending radially outwards while the female die roller 14 is equipped with mating recesses 14a extending radially inwards. The rollers 12, 14 are aligned in their rotational movement such that the protrusions 12 and the recesses 14 meet with each other in a roller nip. For embossing, the core material layer 1 is fed through the roller nip thus forming the raised pattern at the outer side 5 of the core material layer.

Preferably the embossed pattern is also aligned with the printed decor such that the embossed pattern provides visual effects to the decor. This may be accomplished by controlling the die rollers such that the position, at which the protrusions/recesses engage with the core material layer 1, is set based on the characteristics of the decor.

Figure 3:
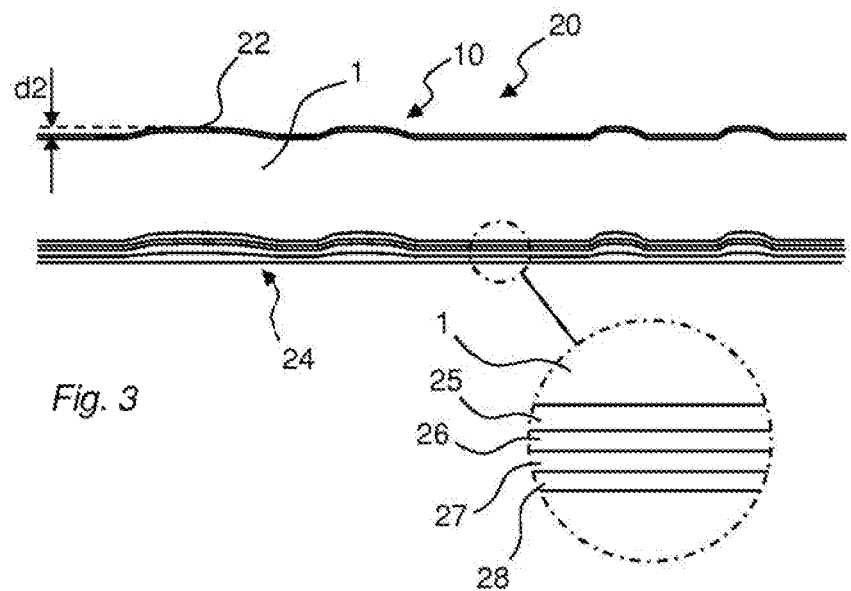
FIG. 3 is a cross-sectional view of a packaging material comprising the core material layer shown in FIGS. 1 and 2, after embossing and subsequent lamination.

After embossing the core material layer 1 is laminated such that protective polymeric layers are provided on the inner side 3 and the outer side 5 of the core material layer 1. The resulting packaging material 20 is shown in FIG. 3. The packaging material 20 comprises the core material layer 1, an outer layer 22, and an inner layer 24, wherein the outer layer 22 and the inner layer 24 are applied to opposite sides of the core material layer 1 after embossing. In an alternative embodiment, the outer layer 22 is applied to the outer side 5 of the core material layer 1 before embossing. The outer layer 22 applied to the outer side 5 of the core material layer 1 is adapted to provide the outer surface of a package to be produced, which outer surface 5 and outer layer 22 faces the surroundings of the package. The inner layer 24 is applied to the other side 3 of the core material layer 1 and is adapted to provide the inner surface of a package to be produced which is in contact with the material contained in the package, i.e. the liquid food product.

The outer layer 22 may comprise at least one layer of polymer material, which is applied to the core material layer 1. Moreover, as previously explained, one of the layers making up the outer layer 22 may be a decorative layer printed on the outer surface 5 of the packaging material to be formed.

The inner layer 24 may comprise at least one innermost layer 27, 28 of polymer material. Such multi-layer structure is shown in FIG. 3. A protective layer 26 may be present between the core material layer 1 and the innermost layer 27, 28. The protective layer 26 may be a foil, such as a metal foil, preferably an aluminium foil. The protective layer 26 is a barrier layer, i.e. protects against oxygen transmission and light to maintain the nutritional value and flavours of the food in the package at ambient temperatures. Alternatively, the protective layer may comprise an oxygen barrier coating applied onto a polymer film substrate, such as a metallised polymer film or a different vapour-deposition coated polymer film.

In addition, a lamination layer 25 may be present between the protective layer 26 and the core material layer 1. The lamination layer 25 may be at least one layer of polymer material.

According to one embodiment, the layers of the packaging material 20 intended for the inside of a finished package, which is in contact with the material contained in the package, i.e. the liquid food product, comprises starting from the core material layer 1: a lamination layer 25, a protective layer 26, and a sealing layer 27, 28. The lamination layer 25 enables the core material 1 to stick to any protective layer 26 applied. The sealing layer 27, 28 enables package sealing.

The polymer layers 22, 25, 27, 28 of the packaging material 20 may be any suitable type of polymer material, preferably a plastic material such as polyethylene.

Again returning to the core material layer 1 shown in FIG. 2, it can be seen that the embossed features 10 have a certain height d1. The height d1, which corresponds to a distance in the normal direction from the flat outer side 5 of the core material layer 1, is defined by the dies used during embossing. Typically, the height d1 is in the range of approximately from 20 to 200 μm, such as 100 μm.

However, and now turning to FIG. 3, during lamination the pressure applied to the core material layer 1 will assist in reducing the height of the embossed features 10. The height after lamination is in FIG. 3 denoted d2 and as is clearly shown d2<d1. Although not wishing to be bound by any specific theory, it is believed that during lamination the entire packaging material 20 will be exposed to a pressing force directed inwards, or towards the centre of the packaging material 20, in a normal direction. The applied pressing force, typically provided by feeding the core material layer 1 and its associated lamination layer(s) through one or more roller nips, will assist in compressing the embossed features 10 whereby their respective height is reduced. It has been shown that a typical height reduction is in the range of 60%; hence an embossed feature 10 having a height d1 of 100 μm will be compressed to a height d2 of approximately 40 μm during lamination.

Although the height reduction obtained during lamination of the packaging material 20 may seem as a clear disadvantage in terms of definition and user recognition, it has surprisingly been found that this height reduction is only temporary, especially if the packaging material 20 is later used in a filling machine for producing individual packages. As will be explained further below, the embossed features 10 will eventually regain at least some of its initial height (d1) such that they again become recognizable to a user.

Figure 4:
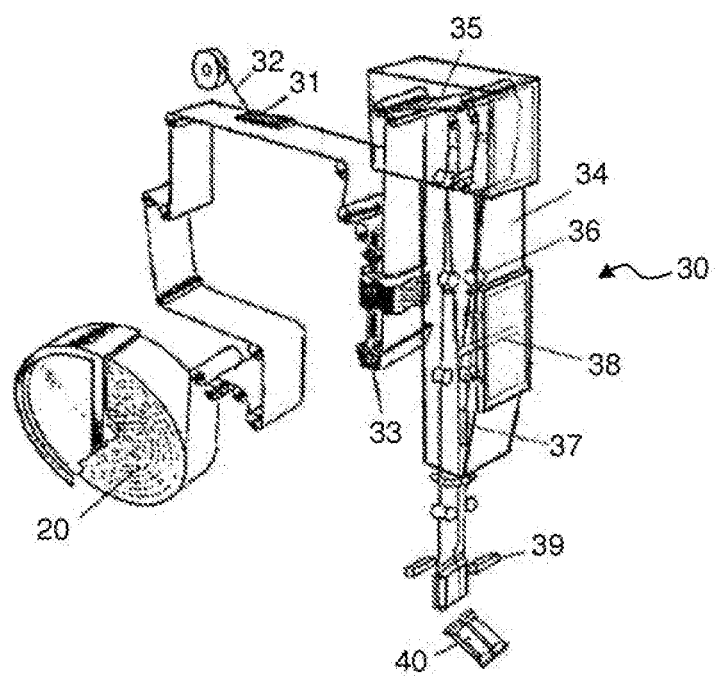
FIG. 4 is a schematic view of a filling machine.

A filling machine 30, schematically shown in FIG. 4, typically includes a number of consecutive stations for transforming a planar packaging material 20 to a closed package 40.

A reel-like and web-shaped packaging laminated material 20 is loaded into the packaging and filling machine 30. The unwound packaging material 20 is transported continually with a feeder of the transporting means, and is transported to a strip applicator 31 through bending rollers, and damper rollers. A strip 32 is continually applied onto one edge of the packaging material 20 by the strip applicator 31.

The packaging material 20 is transferred to a sterilizing unit 33, and is sterilized in sterilizing unit 33 e.g. by means of a sterilizing liquid of hydrogen peroxide or electron beam irradiation. In case of using hydrogen peroxide as sterilizing agent the packaging laminated material 20 is carried to an air knife 34 to be dried by the air knife 34. The packaging laminated material 1 is carried into an aseptic chamber 35 assuring that liquid food is filled up the tube-like packaging material with the aseptic atmosphere. The packaging material 20 is transformed gradually with forming rings 36, and other forming rings to be formed to the tube-like shape.

The tube-like packaging material 20 is preheated by hot air from a preheat means 37 of a longitudinal seal device to be sealed longitudinally. The liquid food is filled up into the tube-like packaging material 20 from a bottom end of a filling pipe 38 outlet. Finally, a transversal sealing unit 39 provides closing of the tube-like packaging material such that a closed upper end is formed simultaneously as a closed bottom end of the tube-like packaging material 20. The sealing unit 39 also performs a transversal cutting in order to separate the finished package 40 from the tube-like packaging material 20. The cut-off package may be further fold-formed and sealed to acquire its final shape, such as a cuboid shape.

Although the filling machine 30 shown in FIG. 4 is shown to produce a certain type of package, it should be noted that the effect of re-establish a part of the height of the embossed features 10 of the packaging material 20 has been proven also for other types of filling machines. Such filling machines include e.g. so-called gable top packages (see e.g. FIG. 6) and so called carton bottles, i.e. carton-sleeved packages being provided with a closed plastic top.

When the packaging material 20 is transported through the filling machine it will be subjected to increased temperature, increased humidity, and eventually increased pressure. The temperature increase is occurring at least partly because of the operating conditions of the filling machine itself, as well as the sealing operation when heat is applied to the lamination layer 27, 28 for obtaining the longitudinal and the transversal seal. The humidity increase is occurring in some cases due to the wet bath of hydrogen peroxide, or if not present simply because of an increased humidity inside the filling machine. The increased pressure is occurring when the tube-like packaging material is filled with its intended product, in particular when the product is liquid. The effect of a humidity increase alone, is relatively much smaller in comparison to the effects of an increased temperature or an increased inside pressure. Thus, the greatest effects on the embossed features 10 regaining height were seen from raising the temperature in the packaging material and/or from increasing the pressure acting on the inner side (3) of the laminated packaging material.

During transport through the filling machine 30 it has been shown that the embossed features 10 present on the outer side of the packaging material will regain some of its height such that the final package 40 is provided with embossed features 10 having a greater height $d3$ than the packaging material 20 prior to filling, forming, and sealing into individual packages 40.

Figure 5:
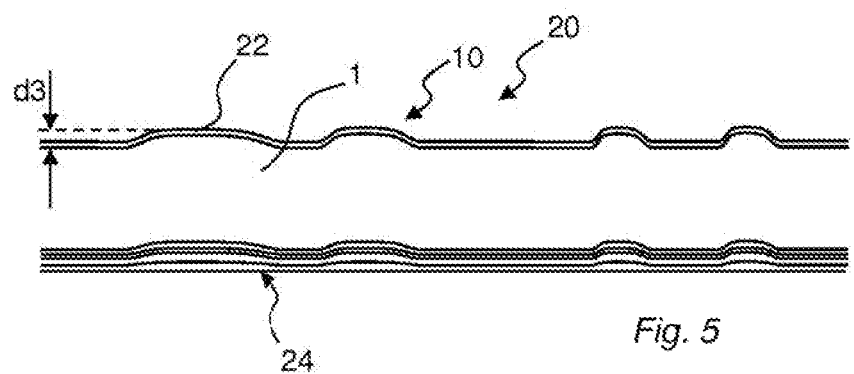
FIG. 5 is a cross-sectional view of the packaging material shown in FIG. 3, after filling, sealing, and forming into a final package.

A part of the packaging material 20 of a produced package 40 is shown in FIG. 5. The height $d3$ of the embossed features 10 is greater than the height of the packaging material 20, but less than the height $d1$ of the embossed features 10 of the core material layer 1 prior to lamination. Hence, $d1>d3>d2$.

In some experiments it has been shown that if $d1 \approx 100$ μm, and $d2 \approx 40$ μm, the height $d3$ of the embossed features on the produced package 40 is approximately 80 μm. Again not wishing to be bound by any specific theory it is believed that the elevated temperature, humidity, and/or interior pressure in combination with a certain relaxation time allows for the embossed features 10 of the packaging material 20 to be de-compressed and consequently at least partly allowing them to return towards their initial height $d1$.

Different types of packages 40 may be obtained from the packaging material 20, and the packaging material 20 or the package 40 being produced may be used for foodstuffs which preferably may be liquid.

Figure 6:
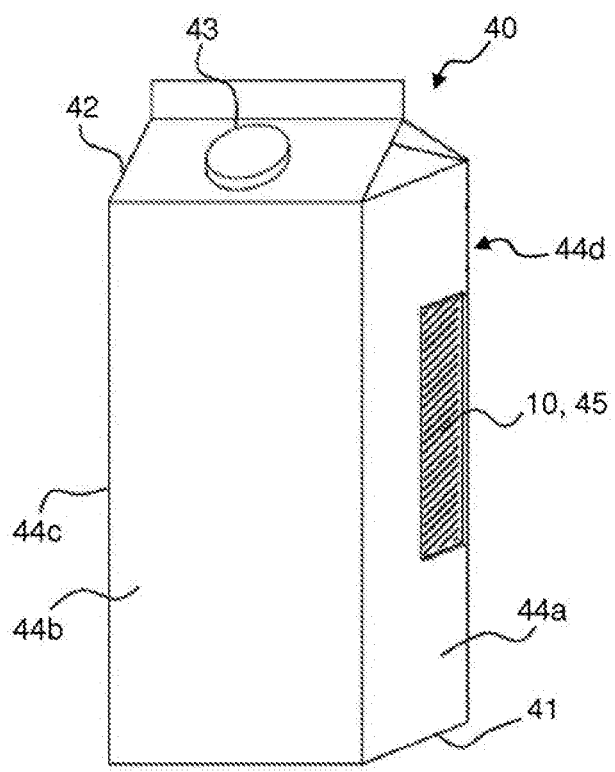
FIG. 6 is an isometric view of a package formed by forming, sealing, and folding the packaging material shown in FIG. 5.

In FIG. 6 an example of a package 40 is shown, which has a closed bottom end 41, a closed upper end 42 being provided with a screw cap 43, and four sidewalls 44*a-d*. As is shown in FIG. 6 at least one sidewall 44*a* is at least partly provided with embossed features 10 arranged within an embossed area 45. The embossed area 45 is preferably positioned such that it corresponds to an intended gripping position of the package 40. However, embossed areas could also be provided at other positions, e.g. for emphasizing particular parts of the decor.

The embossed pattern may include features 10 in the form of straight lines, curved lines, dots, rings, etc.

Figure 7:
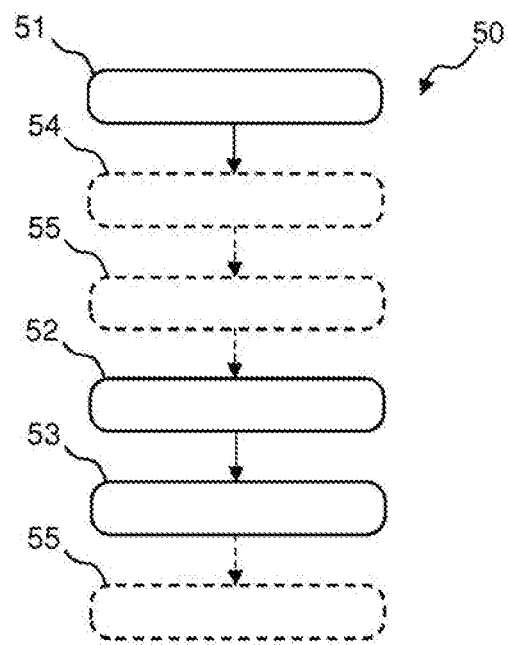
FIG. 7 is a schematic view of a method for producing a packaging material.

Now turning to FIG. 7 a method 50 for producing a packaging material 20 with embossed features 10 will be briefly described.

The method 50 starts off by a step 51 in which a core material layer 1 of fibre-based material is provided. As explained previously, the core material layer 1 has an inner side 3 and an outer side 5. In a subsequent step 52 the core material layer 1 is embossed for forming embossed features 10 having an initial height $d1$. The embossed features 10 protrude from the outer side 5 of the core material layer 1. Preferably, the initial height $d1$ of the embossed features 10 immediately after embossing is in the range of 50-200 μm.

In step 53 at least one layer 24 is laminated to the inner side 3 of the embossed core material layer 1 such that the height of the embossed features 10 is temporarily reduced to a minimum height $d2$. The minimum height $d2$ of the embossed features 10 immediately after lamination is in the range of 20-80% of the height $d1$ prior to lamination, preferably in the range of 30-60%, and even more preferably in the range of 35-45%.

The method 50 may optionally include a step 54, performed prior to embossing 52, of printing a decor layer on the outer side 5 of the core material layer. Further, a yet further step 55 may be performed either before or after embossing 52, in which at least one layer 22 is laminated to the outer side 5 of the core material layer 1.

Figure 8:
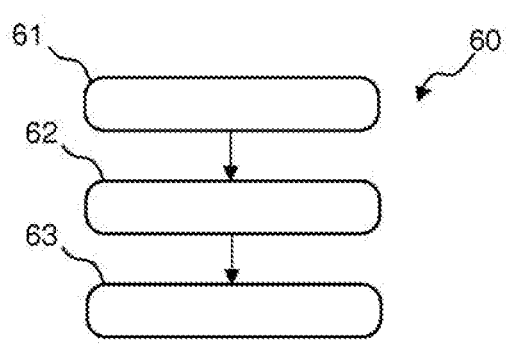
FIG. 8 is a schematic view of a method for producing a package from a packaging material.

Now turning to FIG. 8 a method 60 for producing a package 40 from a packaging material 20 will be described. The packaging material 20 is provided with embossed features 10, wherein the height of the embossed features 10 is temporarily reduced to a minimum height $d2$ from an initial height $d1$ of the core material layer 1. The method comprises a first step 61 of feeding the packaging material 20 through a filling machine 30, and a subsequent step 62 of forming, filling, and sealing a package 40 from at least a part of said packaging material. The method further comprises a step 63 of increasing the temperature of the packaging material 20, the humidity of the packaging material 20, and/or the pressure acting on the packaging material 20 such that the height of the embossed features 10 is increased relative its minimum height d2.

The increase of temperature, humidity, and/or pressure acting on the packaging material 20 is preferably maintained for a certain amount of time, e.g. for >0.1 seconds, such that the desired reshaping of the embossed features 10 is accomplished.

When step 63 is performed such that the temperature is increased, the temperature preferably reaches 30-90° C.

When step 63 is performed such that the humidity is increased, the humidity preferably reaches 50-100%.

When step 63 is performed such that the pressure acting on the packaging material 20 is increased, the pressure preferably reaches 1.1-3 Bar, more preferably 1.5 -2.5 Bar, and even more preferably 1.5-2.2 Bar, i.e. the pressure difference acting on the inner side of the packaging material is preferably from 0.5 to 1.5 Bar, such as from 0.5 to 1.2 Bar. The increase of pressure acting on the packaging material 20 may be performed by filling the package 40 with a liquid content such that the liquid content applies a pressure on the inner side of said package 40. More specifically, the internal pressure in the filled tube of the laminated packaging material may peak during a short time, e.g. for >0.1 seconds, when the transversal sealing of the tube takes place in a high-speed packaging machine.

The height d3 of the embossed features 10 of the final package 40 is preferably in the range of 20-200% of the minimum height d2, more preferably in the range of 50-150%, and even more preferably in the range of 80-120%.

In other words, the height d3 of the embossed features 10 of the final package 40 is preferably in the range of 50-90% of the initial height d1, preferably in the range of 60-90%, and even more preferably in the range of 70-90%.

The invention claimed is:

1. A method for producing a laminated packaging material, comprising:
    providing a core material layer of fibre-based material having an inner side and an outer side,
    embossing said core material layer for forming embossed features having an initial height, said embossed features protruding from the outer side of said core material layer to later form a tactile pattern on a side of a package to be formed by said packaging material, and
    laminating at least one layer to the inner side of said embossed core material layer such that the height of the embossed features is temporarily reduced to a minimum height.
2. The method according to claim 1, wherein the initial height of the embossed features immediately after embossing is in the range of 20-200 μm.
3. The method according to claim 1, wherein the minimum height of the embossed features immediately after lamination is in the range of 20-90% of the height prior to lamination.
4. The method according to claim 1, wherein embossing is performed by arranging the core material layer between a male die and a female die.
5. The method according to claim 4, wherein the male die is provided as a male die roller, the female die is provided as a female die roller, and the core material layer is fed through a nip between said rollers.
6. The method according to claim 1, further comprising printing a decor layer on the outer side of said core material layer prior to embossing.
7. The method according to claim 1, further comprising laminating at least one layer to the outer side of said core material layer prior to embossing.
8. The method according to claim 1, further comprising laminating at least one layer to the outer side of said core material layer after embossing.
9. The method according to claim 1, wherein the at least one layer, is a multi-layer structure comprising at least one layer of polymer material intended to be in contact with a liquid food product contained in the package, a protective layer to protect against oxygen transmission, and a lamination layer of polymer material, the lamination layer being laminated between the protective layer and the core material layer.
10. A laminated packaging material, produced by the method according to claim 1 comprising
    a core material layer of fibre-based material having an inner side and an outer side, said core material layer having embossed features protruding from the outer side of the core material layer to later form a tactile pattern on a side of the package to be formed by said laminated packaging material, the inner side of the core material layer having only indentations and no protrusions,
    at least one outer layer of polymer, laminated to the outer side of the core material layer, and
    a multi-layer structure layer, comprising at least one layer of polymer material intended to be in contact with a liquid food product to be contained in the package, a protective layer to protect against oxygen transmission, and a lamination layer of polymer material, laminated to the inner side of the core material layer, the lamination layer thus being laminated between the protective layer and the core material layer, wherein
    the embossed features, appearing on the laminated packaging material, are flattened to have a temporarily reduced minimum height, and are able to regain height by one or more steps of action during at least 0.1 s, selected from increasing the temperature in the packaging material so that the temperature in the packaging material is at least 30° C. and up to 90° C., and increasing the pressure acting on the inner side of the packaging material so that the pressure acting on the inner side of the packaging material is at least 0.5 and up to 1.2 Bar over-pressure, such that the height of the embossed features is increased relative to its minimum height and thereby provides the intended tactile effect.
11. The laminated packaging material according to claim 10, wherein the protective layer is a metal foil.
12. The laminated packaging material according to claim 10, further comprising a printed decor layer on the outer side of the core material layer, wherein the embossed features are aligned with a printed decor such that the embossed features also provide visual effects to the decor.
13. The laminated packaging material according to claim 10, wherein the protective layer is an aluminium foil.
14. A method for producing a package from a packaging material having embossed features to later form a tactile pattern on a side of the package to be formed by said packaging material, wherein the height of said embossed features is temporarily reduced to a minimum height, the method comprising:
    feeding the packaging material through a filling machine, and forming, filling, and sealing the package from at least a part of said packaging material, wherein the method further comprises increasing the temperature of the packaging material, the humidity of the packaging material, and/or the pressure acting on the packaging material such that the height of the embossed features is increased relative to its minimum height.

15. The method according to claim 14, wherein increasing the temperature of the packaging material is performed such that the temperature reaches 30-90° C.

16. The method according to claim 14, wherein increasing the pressure acting on the packaging material is performed by filling the package with a liquid content such that the liquid content applies a pressure on the inner side of said package.

17. The method according to claim 14, wherein the height of the embossed features of the final package is increased by 20-200% relative to the minimum height.

18. The method according to claim 14, wherein the packaging material is manufactured by a method comprising:
   providing a core material layer of fibre-based material having an inner side and an outer side;
   embossing said core material layer to form the embossed features, said embossed features having an initial height, and protruding from the outer side of said core material layer to later form a tactile pattern on a side of the package to be formed by said packaging material; and
   laminating at least one layer to the inner side of said embossed core material layer such that the height of the embossed features is temporarily reduced to the minimum height.

19. The method according to claim 18, wherein the height of the embossed features of the package is increased by 50-90% relative to the initial height.

* * * * *